United States Patent

Reiss

[11] 4,125,264
[45] Nov. 14, 1978

[54] RECORD POSITIONING DEVICE

[76] Inventor: Theodore Reiss, 749 E. 22nd St., Brooklyn, N.Y. 11210

[21] Appl. No.: 818,947

[22] Filed: Jul. 25, 1977

[51] Int. Cl.² ................................................ G11B 1/00
[52] U.S. Cl. ................................................... 274/1 R
[58] Field of Search ....................... 274/1 R; 294/65.5

[56] References Cited

U.S. PATENT DOCUMENTS

| 512,381 | 1/1894 | Keyes | 294/65.5 |
| 1,471,092 | 10/1923 | Blaha | 274/1 R |
| 3,169,791 | 2/1965 | Twachtman | 294/65.5 |

Primary Examiner—Charles E. Phillips
Attorney, Agent, or Firm—Flynn & Frishauf

[57] ABSTRACT

Record alignment apparatus is disclosed for placing a record on the spindle of a record player especially where the spindle is not fully accessible or visible or where the user is fully or partially blind.

11 Claims, 2 Drawing Figures

RECORD POSITIONING DEVICE

This invention relates to apparatus to facilitate the placing of records on a record player spindle.

Accordingly, an object of the present invention is to provide apparatus which enables the user to feel or sense when the record is properly positioned or aligned with the spindle.

Another object of the present invention is to provide a method for sensing when the record is properly aligned over the spindle and to release the record onto the spindle after proper alignment is sensed.

Figure 1:
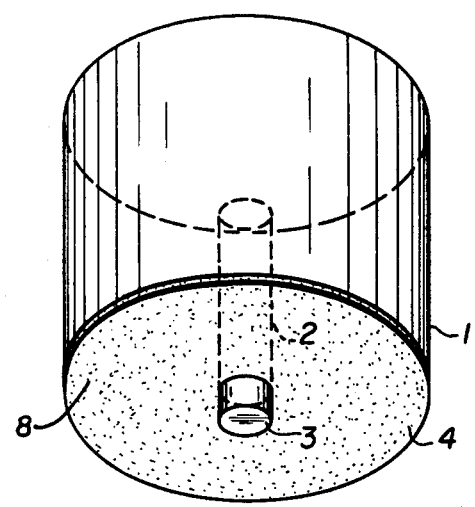
FIG. 1 shows the alignment apparatus of this invention.

Referring to FIG. 1, the apparatus of this invention includes a permanent magnet 2 and a magnet holder 1. The permanent magnet 2 preferably extends below the bottom surface 4 of the magnet holder, a distance at least equal to the thickness of the record to be positioned on the spindle. Using the apparatus of FIG. 1, the spindle is located as follows: (A) the magnet of the apparatus of FIG. 1 is inserted into the record hole; (B) the record is then moved over the turntable until the magnet establishes a magnetic field in the spindle which provides a sensory indication that the record is properly positioned over the spindle. The record is released when the magnetic pull is sensed to be greatest. If the spindle is not made of a material in which a magnetic flux can be induced then it is within the scope of this invention that the spindle be replaced with a magnetically permeable material or preferably be formed of a permanent magnet which has a polarity opposite to that of the magnet 2 in the magnet holer. This will further enhance the magnetic "pull" or feel to enable the blind positioning of the record on the spindle.

Figure 2:
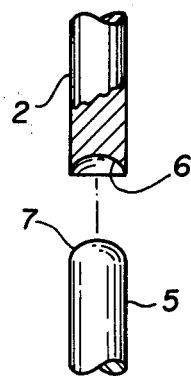
FIG. 2 shows one modification of the apparatus of FIG. 1.

FIG. 2 discloses a modification of this invention in which the bottom surface of the magnet 2 extending below the holder 1 has a shaped surface 6 which is designed to mate with the top surface 7 of the spindle 5. Thus, the pull of the magnet gives an initial position for the spindle. The user then slightly adjusts the position of the record until the mating of the surface is also sensed. The record is then slipped onto the spindle and the holder 1 is removed.

The size of the projection portion 3 of magnet 2 should be such that it fits snugly into the record; yet, nonetheless permits release of the records with a slight force when the record is properly aligned.

Although the shape of the holder is not important, it has been found that for blind persons a cylindrical-shape reduces damage to the records. A particularly convenient size has been found to be a cylinder with a 2 inch diameter and a height of 1¾ inches. The magnet is positioned to extend through the center of the bottom surface 4. The holder 1 may vary in size depending on the center groove free space of the records to be used. The holder should not extend over the grooves without protection. The holder may be formed of plastic, wood, non-magnetic metal, etc. In order to protect the record surface onto which face 4 fits, face 4 may be provided with a felt or sponge rubber coating 8 or surface which adheres to holder 1. In this event, the magnet portion 3 extending beyond the holder 1 should protrude a distance which will hold the record even when the record contacts the felt or rubber.

There are over 350,000 persons today in the U.S. using talking book records. This invention will permit these persons to more readily use the talking book records with less damage to the records. It will also facilitate the use of records by persons with normal vision who have turntables which are in somewhat inaccessible locations such as deep cabinets.

I claim:

1. As an article of manufacture, a phonograph record handling device comprising means substantially non-visually aligning the central hole in the phonograph record with a spindle of a record player turntable made of magnetically responsive material and having a convex top surface, including;

a holder block having a bottom record engaging surface, at least a portion of which is flat;

and a permanent magnet rigidly mounted in said holder block having an outer dimension to fit snugly into the center hole of the record and perpendicularly protruding from said flat surface portion of the holder block by a distance at least equal to the thickness of the record to be positioned on the turntable; the record engaging surface area of the holder enclosing an area several times greater than the cross-sectional area of the permanent magnet taken in a plane parallel to the flat record engaging surface, said flat portion defining a record bearing surface located at least at the outer periphery of the record engaging surface to maintain the record in a plane at right angles to the direction of protrusion of said magnet to enable a firm, positive engagement of the record handling device with the record at the central location thereof and to substantially non-visually locate said block at the center of said record;

wherein at least the flat portion of the bottom surface of the holder is provided with a shock absorbing surface to prevent damage to the record as the magnet is inserted into the whereby the positioning device will induce a magnetic flux in the spindle when the permanent magnet is brought into the vicinity of the spindle and, when associated with a record, will permit the user to substantially non-visually sense alignment of the center hole of the record with the spindle.

2. The article of claim 1 for use with a spindle formed of a permanent magnetic material, wherein the permanent magnet mounted in the holder has a polarity opposite to that of the spindle to thereby increase the magnetic pull and enhance the sensing of proper positioning to the user.

3. The article of claim 1 in which the permanent magnet has a generally concave bottom surface which mates with the generally convex top surface of the spindle when the two surfaces are aligned properly to facilitate moving the record from the holder onto the spindle.

4. The article of claim 1, wherein the holder block is cylindrical and of a diameter which is greater than the axial length of the cylindrical block.

5. The article of claim 1, wherein the holder block is cylindrical and of about 5 cm diameter.

6. The article of claim 5, wherein the holder block has an axial length of about 4-½ cm.

7. The article of claim 1, wherein the holder block is cylindrical and has an axial length of about 4-½ cm.

8. The article of claim 1, wherein the record bearing surface is smaller than the groove-free space of the record.

9. The article of claim 1 wherein the magnet protrudes for a distance equal to the thickness of a phonograph record.

10. The article of claim 1, in which the permanent magnet has a generally concave bottom surface which mates with the generally convex top surface of the spindle when the two surfaces are aligned properly to facilitate moving the record from the holder onto the spindle.

11. The article of claim 1 wherein the shock absorbing surface comprises a layer of shock material.

* * * * *